(12) United States Patent
Park

(10) Patent No.: US 7,778,977 B2
(45) Date of Patent: Aug. 17, 2010

(54) COMPOSITE IMAGE APPARATUS AND COPY METHOD THEREOF

(75) Inventor: Dae Young Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1128 days.

(21) Appl. No.: 11/434,108

(22) Filed: May 16, 2006

(65) Prior Publication Data
US 2007/0005638 A1  Jan. 4, 2007

(30) Foreign Application Priority Data
Jun. 30, 2005  (KR) .................... 10-2005-0058044

(51) Int. Cl.
*G06F 17/30* (2006.01)
(52) U.S. Cl. ................................ 707/667
(58) Field of Classification Search ............ 707/1, 707/10, 100, 104.1, 200, 203, 204; 709/225
See application file for complete search history.

(56) References Cited

U.S. PATENT DOCUMENTS

| | | |
|---|---|---|
| 6,507,363 B1 | 1/2003 | Anderson et al. |
| 6,901,403 B1 * | 5/2005 | Bata et al. .................. 707/101 |
| 7,113,454 B2 * | 9/2006 | Matsuoka ................ 369/30.04 |
| 7,356,679 B1 * | 4/2008 | Le et al. ........................ 713/1 |
| 2003/0028868 A1 * | 2/2003 | Kumakura .................. 717/175 |
| 2004/0122866 A1 * | 6/2004 | Igarashi et al. ........... 707/104.1 |
| 2005/0108293 A1 * | 5/2005 | Lipman et al. .............. 707/200 |
| 2005/0289109 A1 * | 12/2005 | Arrouye et al. ................ 707/1 |

FOREIGN PATENT DOCUMENTS

JP  2003-223347  8/2003

* cited by examiner

*Primary Examiner*—Cam-Linh Nguyen
(74) *Attorney, Agent, or Firm*—Stanzione & Kim LLP

(57) ABSTRACT

A composite image apparatus and a copy method thereof. The composite image apparatus includes an optical recording unit in which first and second storage media are each able to store a plurality of video files and a plurality of audio files, the apparatus being adapted to copy the files stored in one of the first and second storage media to the other. The method includes determining, if a copy direction and one or more target files to be copied among the files stored in the one storage medium are selected by a user in a copy operation, whether one or more additional folders must be created in the other storage medium together with a copy folder of a folder of the one storage medium containing the selected target files, and creating, if the additional folders are determined to have to be created together with the copy folder, the copy folder and additional folders in the other storage medium, and storing the selected target files separately in the created copy folder and additional folders.

15 Claims, 8 Drawing Sheets

FIG.3C

| | |
|---|---|
| 01 | I Want to Hold Your Hand |
| 02 | Yesterday |
| 03 | Come Together |
| 04 | She Loves You |

FIG. 4A

Do you want to create folders?

Yes     No

FIG. 4B

```
┌─────────────────────────────────────────────┐
│   ┌───────────────────────────────────┐     │
│   │  Please input the number of       │     │
│   │  folders to be created            │     │
│   └───────────────────────────────────┘     │
│     ★  ★                                    │
│     ‾  ‾                                    │
│                                             │
│                                             │
└─────────────────────────────────────────────┘
```

COMPOSITE IMAGE APPARATUS AND COPY METHOD THEREOF

CROSS-REFERENCE TO RELATED APPLICATION

This application claims the benefit of Korean Application No. 2005-58044, filed Jun. 30, 2005, in the Korean Intellectual Property Office, the disclosure of which is incorporated herein by reference.

BACKGROUND OF THE INVENTION

1. Field of the Invention

An aspect of the present invention relates to a composite image apparatus and a copy method thereof, and, more particularly, to a composite image apparatus and a copy method thereof wherein when files that are stored in a first storage medium are copied to a second storage medium, one or more folders are additionally created in the second storage medium so that one or more target files to be copied among the files stored in the first storage medium are separately stored in the additionally created folders and a copy folder of a folder of the first storage medium containing the target files.

2. Description of the Related Art

Generally, a composite image apparatus is an integrated system comprising two or more imaging devices. For example, a digital versatile disc (DVD) player (DVDP) and video cassette recorder (VCR) have been combined to form a DVDP/VCR combo, and a hard disk drive (HDD) and a digital versatile disc drive have been combined to form an HDD/DVD recorder.

Among these conventional composite image apparatuses, the HDD/DVD recorder comprises, as introduced in a web page of Toshiba Japan (www.toshiba.co.jp), an HDD and DVD drive installed in a cabinet. The HDD/DVD recorder stores externally supplied videos in the HDD or DVD (DVD-R/RW/RAM), and reproduces a video stored in the HDD or DVD. If necessary, selected videos stored in the HDD may be copied to the DVD or selected videos stored in the DVD may be copied to the HDD. This copy operation (generally referred to as "dubbing") may be performed in various ways, such as a high speed mode and transrating mode.

In addition to the videos, joint photographic experts group (JPG) files, moving picture experts group 1 (MPEG-1), and audio layer 3 (MP3) files may be stored on the DVD installed in the DVD drive of the HDD/DVD recorder and may also be stored in the HDD thereof. Selected JPG or MP3 files stored in the HDD may be copied to the DVD, and selected JPG or MP3 files stored on the DVD may be copied to the HDD.

However, in this conventional HDD/DVD recorder, when a plurality of JPG files or a plurality of MP3 files are copied, one or more target files to be copied among the files and a folder containing the target files are copied as they are. This may cause a problem in that some of the target files are not copied and are left out in the copy operation. This problem may occur when the target files stored on the DVD are copied to the HDD, because a copy folder created in the HDD has a limit in the number of accommodatable files. Consequently, if the number of the target files to be copied is larger than the number of accommodatable files in the copy folder created on the HDD, some of the target files excluding those accommodatable files in the copy folder of the HDD are not copied.

In addition, if a large number of copied files are contained in the copy folder after the copy operation is performed using the conventional copy method, locating a desired file to be edited may not be easy and, thus, a long time may be required to edit the files contained in the copy folder.

SUMMARY OF THE INVENTION

Therefore, an aspect of the invention provides a composite image apparatus and a copy method thereof wherein in a copy operation, in addition to a copy folder of a folder of a first storage medium containing one or more target files to be copied, one or more additional folders are created in a second storage medium to newly store the target files, and the target files are separately stored in the created copy folder and additional folders.

Additional and/or other aspects and advantages of the invention will be set forth in part in the description which follows and, in part, will be obvious from the description, or may be learned by practice of the invention.

In accordance with one aspect of the invention, there is provided a copy method for a composite image apparatus which comprises an optical recording unit in which first and second storage media are each able to store a plurality of video files and a plurality of audio files, the apparatus being adapted to copy the files stored in one of the first and second storage media to the other, the method comprising determining, if a copy direction and one or more target files to be copied among the files stored in the one storage medium are selected by a user in a copy operation, whether one or more additional folders must be created in the other storage medium together with a copy folder of a folder of the one storage medium containing the selected target files; and creating, if the additional folders are determined to have to be created together with the copy folder, the copy folder and additional folders in the other storage medium, and storing the selected target files separately in the created copy folder and additional folders.

According to an aspect of the invention, the determining includes determining that the additional folders must be created in the other storage medium, if a folder creation command is inputted by the user and the number of the additional folders to be created is specified by the user.

Alternatively, the determining may include determining that the additional folders must be created in the other storage medium, if the number of the target files is larger than the number of files accommodatable in the copy folder.

According to an aspect of the invention, the video files include joint photographic experts group (JPG) files and the audio files include moving picture experts group 1 (MPEG-1) audio layer 3 (MP3) files.

According to an aspect of the invention, the first storage medium includes a digital versatile disc (DVD) and the second storage medium includes a hard disk drive (HDD).

According to an aspect of the invention, the copy method further comprises storing all of the target files stored in the one storage medium in the copy folder of the other storage medium without creating the additional folders, if the additional folders are determined to not be needed to be created in addition to the copy folder.

In accordance with one aspect of the invention, there is provided a composite image apparatus comprising: an optical recording unit including a first storage medium to store a plurality of video files and a plurality of audio files; a second storage medium to also store the plurality of video files and the plurality of audio files; and a controller to, in a copy operation where the files stored in one of the first and second storage media are copied to the other and upon determining that one or more additional folders must be created together with a copy folder of a folder of the one storage medium containing one or more target files to be copied among the files stored in the one storage medium, create the copy folder and the additional folders in the other storage medium and store the target files separately in the created copy folder and additional folders.

The controller may determine that the additional folders must be created in the other storage medium if a folder creation command is inputted by a user and the number of the additional folders to be created is specified by the user.

Alternatively, the controller may determine that the additional folders must be created in the other storage medium if the number of the target files is larger than the number of files accommodatable in the copy folder.

According to an aspect of the invention, the video files include joint photographic experts group (JPG) files and the audio files include moving picture experts group 1 (MPEG-1) audio layer 3 (MP3) files.

According to an aspect of the invention, the first storage medium includes a digital versatile disc (DVD) and the second storage medium includes a hard disk drive (HDD).

The controller may store all of the target files stored in the one storage medium in the copy folder of the other storage medium without creating the additional folders if the additional folders are determined to not be needed to be created in addition to the copy folder.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A to 3C are diagrams illustrating guide screens helping the user to choose a copy direction and target files to copy;

FIGS. 4A and 4B are diagrams illustrating guide screens helping the user to specify whether additional folders must be created and the number of the additional folders to be created.

DETAILED DESCRIPTION OF THE EMBODIMENTS

Figure 1:
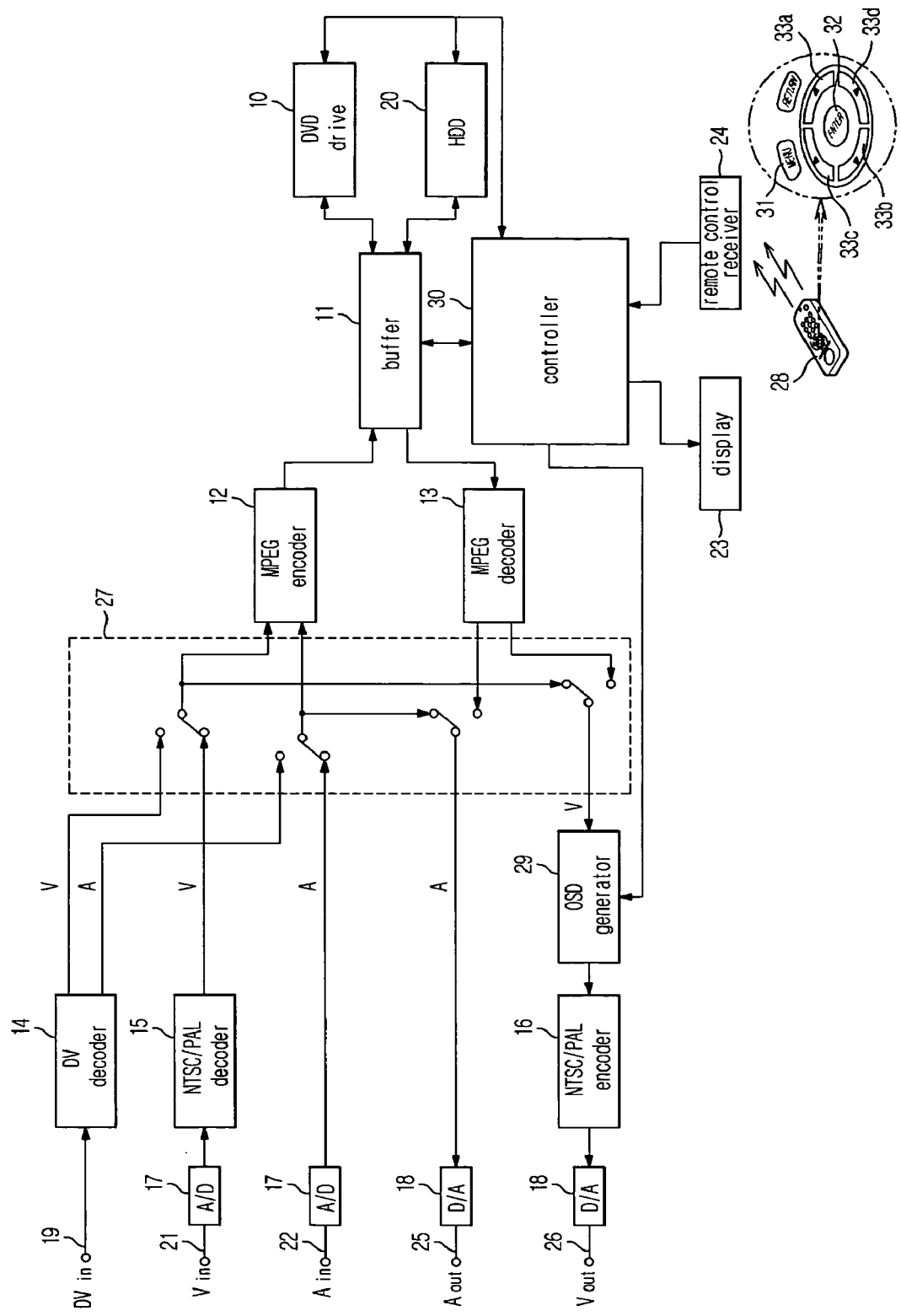
FIG. 1 is a block diagram showing the configuration of an HDD/DVD recorder as a composite image apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing the configuration of an HDD/DVD recorder as a composite image apparatus according to an embodiment of the present invention. As shown in FIG. 1, the HDD/DVD recorder comprises a plurality of input terminals 19, 21 and 22, a plurality of output terminals 25 and 26, a plurality of analog-to-digital (A/D) converters 17, a plurality of digital-to-analog (D/A) converters 18, a digital video (DV) decoder 14, a National Television System Committee/Phase Alternation Line (NTSC/PAL) decoder 15, and an NTSC/PAL encoder 16. The HDD/DVD recorder also comprises a switching circuit 27, a moving picture experts group (MPEG) encoder 12, an MPEG decoder 13, a controller 30, an on screen display (OSD) generator 29, a buffer 11, a DVD drive 10, an HDD 20, a display 23, and a remote control receiver 24.

As for the input terminals, FIG. 1 illustrates a digital interface terminal (DVin) denoted by reference numeral 19, a video input terminal (Vin) denoted by reference numeral 21, and an audio input terminal (Ain) denoted by reference numeral 22. The DVin 19 receives audio video (AV) data of a DV format. The Vin 21 receives a video signal of an NTSC or PAL format transmitted from a tuner (not shown), a set-top box (not shown), or the like. The Ain 22 receives an audio signal transmitted from the tuner, the set-top box, or the like.

As for the output terminals, FIG. 1 illustrates a video output terminal (Vout) denoted by reference numeral 26, and an audio output terminal (Aout) denoted by reference numeral 25. The Vout 26 outputs a video signal of the NTSC or PAL format to a display device (not shown) connected to the Vout 26. The Aout 25 transmits an audio signal to the display device.

The DV decoder 14 converts the AV data of the DV format inputted via the DVin 23 into video and audio signals of an International Telecommunication Union-R (ITU-R) BT format. The NTSC/PAL decoder 15 converts the video signal of the NTSC or PAL format inputted via the DVin 21 into video and audio signals of the ITU-R BT format. The NTSC/PAL encoder 16 converts a video signal of the ITU-R BT format from the MPEG decoder 13 into a video signal of the NTSC or PAL format.

The switching circuit 27 transmits the video signal from the NTSC/PAL decoder 15 to the MPEG encoder 12 and the OSD generator 29. The switching circuit 27 transmits the audio signal inputted via the Ain 22 to the MPEG encoder 12 and the Aout 25. To record the AV data of the DV format, the switching circuit 27 transmits the video signal from the DV decoder 14 to the MPEG encoder 12 and the OSD generator 29, and transmits the audio signal from the DV decoder 14 to the MPEG encoder 12 and the Aout 25. In a reproduction mode, the switching circuit 27 transmits the video signal from the MPEG decoder 13 to the OSD generator 29, and transmits an audio signal from the MPEG decoder 13 to the Aout 25.

The MPEG encoder 12 compression-encodes the video signal of the ITU-R BT format and the digital audio signal in an MPEG-2 format into an AV data stream. In contrast to the operation of the MPEG encoder 12, the MPEG decoder 13 converts an AV data stream into a video signal of the ITU-R BT format and digital audio signal.

The controller 30 controls a copy operation between the DVD and the HDD 20 and also controls all of the components of the HDD/DVD recorder. The controller 30 also generates an OSD image, which will be displayed by the display device connected to the HDD/DVD recorder, and provides the OSD image to the OSD generator 29. Then, the OSD generator 29 displays the OSD image provided from the controller 30 on a screen of the display device. The buffer 11 is used to temporally store the AV data stream. The DVD drive 10 loads a DVD therein to read/write AV data from/to the DVD. The HDD 20 stores various data separately from the DVD drive 10. Here, both JPG files, which are compressed still images such as typical photographs, and MP3 files, which are compressed audio signals such as typical music, may be stored in the DVD or the HDD 20. For example, the user may load a DVD in a DVD drive of a personal computer (PC) to download favorite photographs (JPG files) or songs (MP3 files) to the DVD, then load the DVD in the DVD drive 10 of the HDD/DVD recorder and copy the photographs or songs stored on the DVD to the HDD 20, thereby storing the JPG and MP3 files in the DVD and HDD 20.

The remote control receiver 24 receives a signal from a remote controller 28 and transmits the received signal to the controller 30. The remote controller 28 includes a menu button 31 to load or close a menu on the display device connected to the HDD/DVD recorder, an enter button 32 to select a desired item among items displayed on the screen of the display device, and up, down, left and right direction buttons 33*a*, 33*b*, 33*c* and 33*d* to provide an ability to virtually move a cursor among the items displayed thereon.

Figure 2:
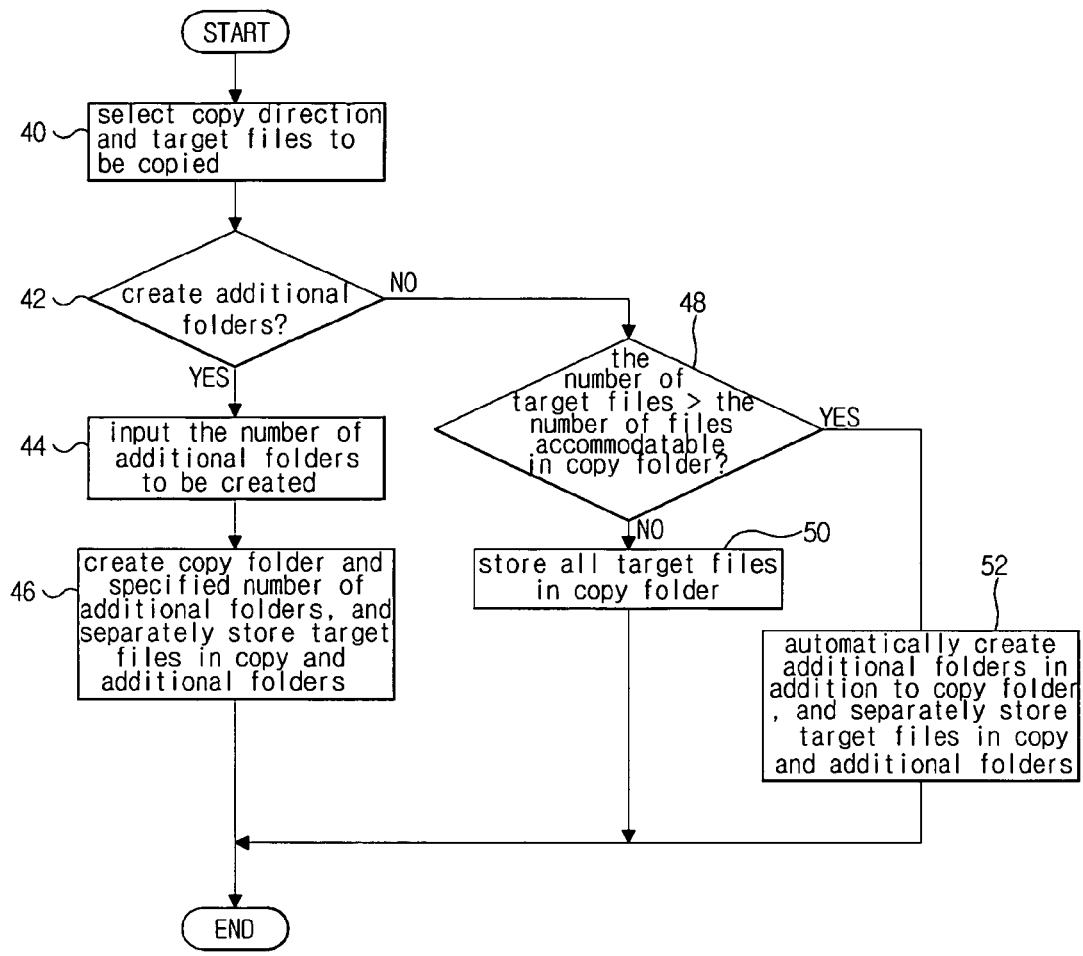
FIG. 2 is a flow chart illustrating a copy method for the composite image apparatus according to an embodiment of the present invention.
Figure 3A:
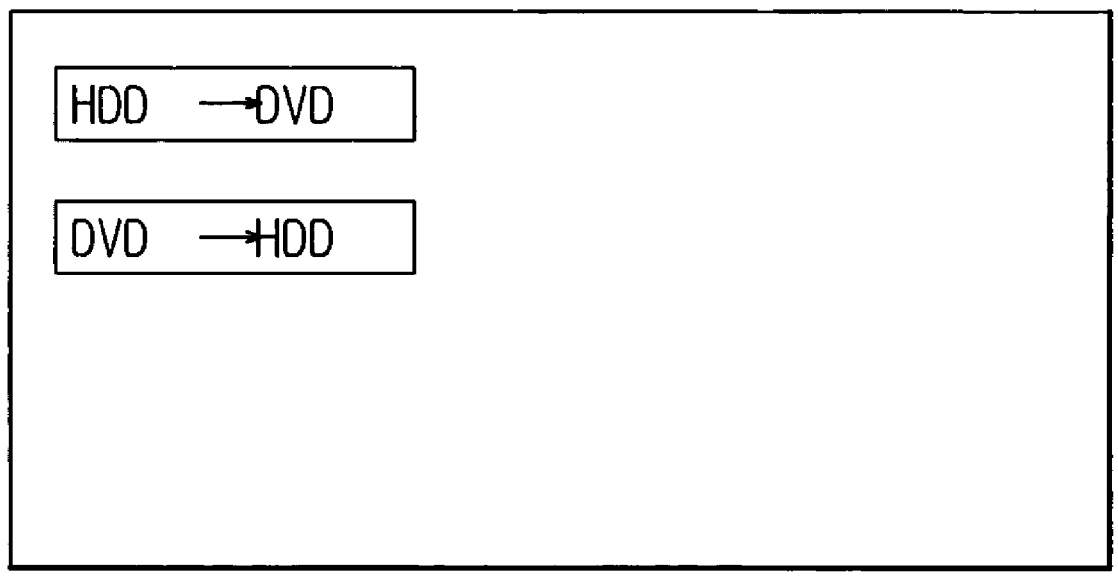

Hereinafter, according to an embodiment of the present invention, a copy method of the composite image apparatus will be described with reference to FIG. 2. To copy desired JPG or MP3 files stored in the HDD 20 to a DVD or to copy desired JPG or MP3 files stored on the DVD to the HDD 20, the user selects a copy item of the menu of the display device or presses a copy button provided on the remote controller 28. Then, the controller 30 displays a screen as shown in FIG. 3A on the display device connected to the HDD/DVD recorder. The screen of FIG. 3A is used to guide the user to select a copy direction of either from the HDD 20 to the DVD or from the DVD to the HDD 20. At this time, the user selects a HDD→DVD item to copy the files stored in the HDD 20 to the DVD or a DVD→HDD item to copy the files stored on the DVD to the HDD 20.

Figure 3B:
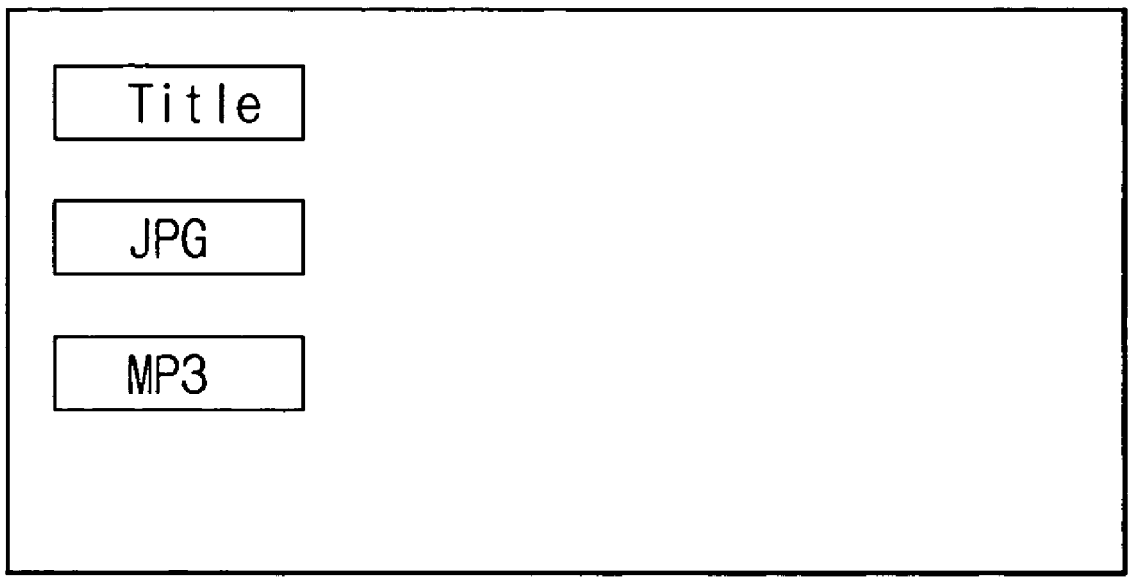

After the user selects the copy direction from FIG. 3A using the up, down, left and right direction buttons 33*a*, 33*b*, 33*c* and 33*d* and the enter button 32, the controller 30 displays a screen similar to that which is shown in FIG. 3B on the display device. The screen of FIG. 3B is used to guide the user to select a desired file type among a title, JPG, or MP3 file for target files to be copied which are stored in the HDD 20 or DVD. At this time, the user selects a Title item of FIG. 3B to copy titles, a JPG item to copy JPG files, or an MP3 item to copy MP3 files, through the up, down, left and right direction buttons 33*a*, 33*b*, 33*c* and 33*d* and the enter button 32.

If the user designates MP3 files as the target files by selecting the MP3 item from the items of FIG. 3B, the controller 30 displays a list of all MP3 type files stored in the HDD 20 or DVD on the display device, as shown in FIG. 3C, so that the user may select desired target MP3 files from the MP3 file list displayed on the screen of the display device (operation 40).

Figure 4A:
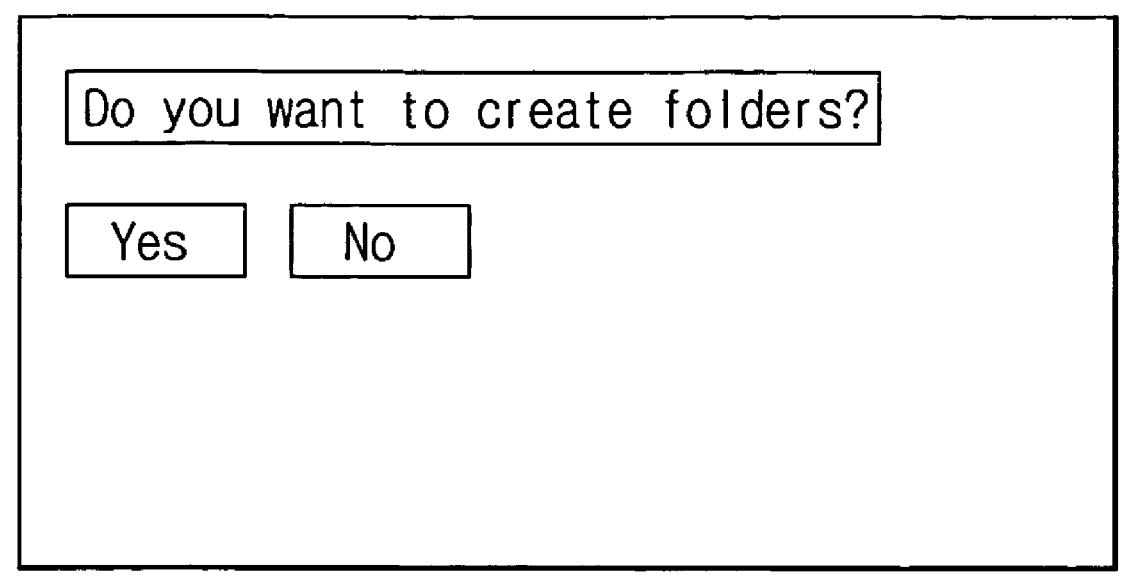

After the copy direction and target files to be copied are selected by the user as described above, the controller 30 displays a screen as shown in FIG. 4A on the display device to guide the user in determining whether one or more additional folders must be created. Namely, the user is requested to determine whether the additional folders must be created during a copy operation, as shown in FIG. 4A. If the user chooses "Yes," the controller 30 determines that the user desires to create additional folders in addition to a copy folder (operation 42), and displays a guide screen as shown in FIG. 4B on the display device to request the user to input the number of the additional folders to be created (operation 44). Here, the copy folder is a copied folder of a folder containing the target files, and is created in a storage medium in which the target files will be newly stored.

If the user inputs the number of the additional folders to be created through number buttons of the remote controller according to the screen of FIG. 4B (operation 44), the controller 30 creates the copy folder and the additional folders where the number of the additional folders is the same as that inputted by the user, and separately stores the target files in the created copy folder and additional folders (operation 46).

For example, to copy two hundred and fifty (250) music files (250 MP3 files) contained in a folder A of the DVD to the HDD, if the user inputs nine (9) as the number of the additional folders to be created, nine folders are created in the HDD 20 in addition to a folder A' acting as a copy folder of the folder A. Then, the two hundred and fifty music files contained in the folder A are separately stored in the folder A' and nine additional folders, whereby each of the folders contains twenty-five music files.

On the other hand, if the user chooses "No" at operation 42, the controller 30 determines whether the number of the target files is larger than the number of files accommodatable in the copy folder (operation 48). If the number of the target files is larger than the number of files accommodatable in the copy folder, the controller 30 automatically creates one or more additional folders in addition to the copy folder and separately stores the target files in the created copy folder and additional folders (operation 52). For example, when the user tries to copy two hundred and fifty (250) music files (250 MP3 files) contained in a folder A of the DVD to the HDD 20 without specifying any additional folder and if the number of files accommodatable in a folder A' acting as a copy folder of the folder A is two hundred (200), the controller 30 creates an additional folder B in the HDD 200 in addition to the copy folder A', and stores two hundred target files in the folder A' and stores the remaining fifty in the additional folder B, respectively.

If the number of the target files is less than or equal to the number of files accommodatable in the copy folder at operation 48, the controller 30 stores all of the target files in the copy folder without creating the additional folders in the medium in which the target files will be newly stored.

The various guide screens of FIGS. 3A to 3C and FIGS. 4A and 4B are illustrated for the purpose of description of the present invention, and thus may be illustrated in different manners from those of the figures.

Figure 5:
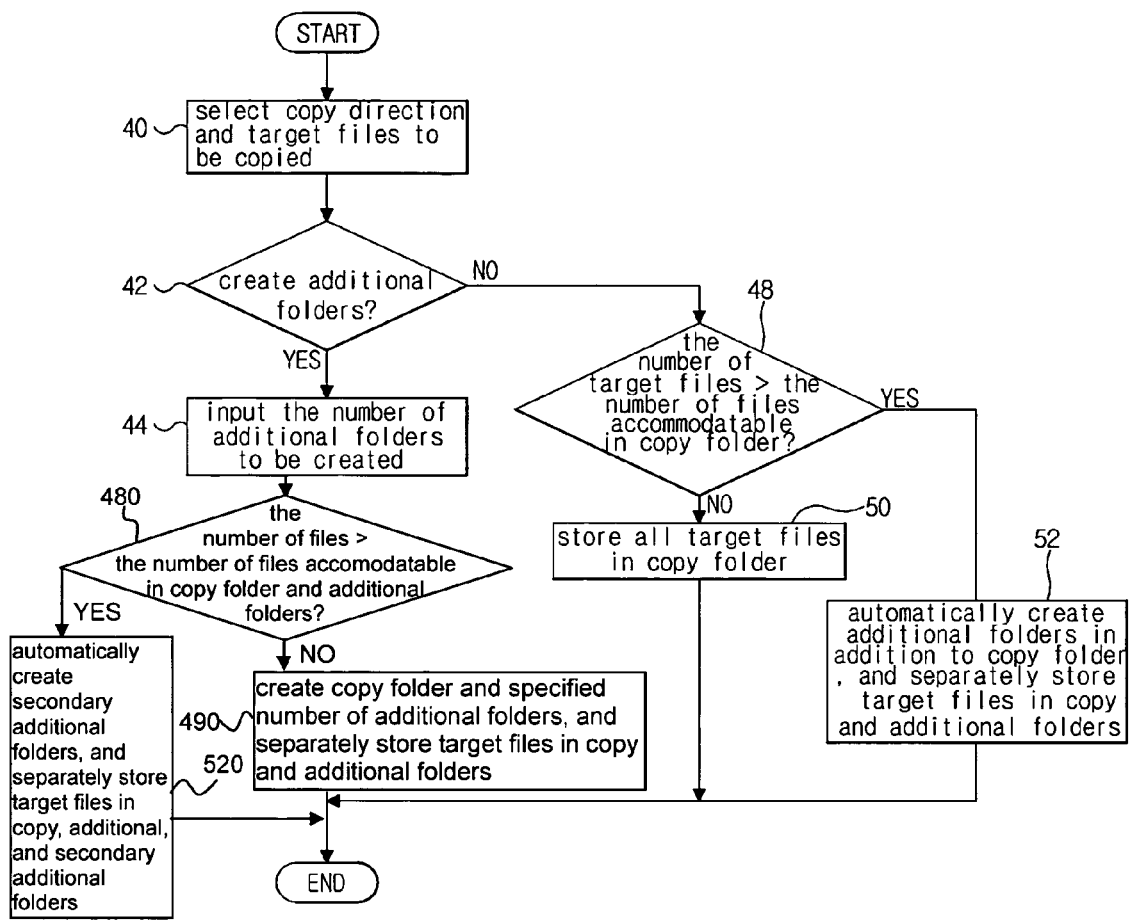
FIG. 5 is a flow chart illustrating a copy method for the composite image apparatus according to another embodiment of the present invention.

With reference to FIG. 5, another embodiment of a copy method of the composite image apparatus will be described below. As shown, many of the operations of the embodiment of FIG. 5 are similar to the embodiment of FIG. 2, and, as such, a detailed explanation of those operations will be omitted.

According to this embodiment, if the user decides to create additional folders and has inputted the specified number of additional folders to be created, the controller 30 determines whether the number of target files is larger than the number of accommodatable files in the copy folder and the additional folders, even where the files are apportioned equally among the copy folder and the additional folders (operation 480). If the controller 30 determines that the number of target files is less than the number of accommodatable files in the copy folder and the specified number of additional folders, the controller 30 creates the copy folder and the specified number of additional folders, and separately stores target files in the copy and additional folders (operation 490).

However, if the controller 30 determines that the number of target files is larger than the number of accommodatable files in the copy folder and the specified number of additional folders, the controller 30 automatically creates a sufficient number of secondary additional folders, and separately stores the target files in the copy, additional, and secondary additional folders (operation 520).

As is apparent from the above description, an aspect of the present invention provides a composite image apparatus and a copy method thereof, wherein in a copy operation where JPG or MP3 files stored in an HDD are copied to a DVD or JPG or MP3 files stored on the DVD are copied to the HDD, if the number of target JPG or MP3 files to be copied exceeds the number of files accommodatable in a copy folder, one or more additional folders are automatically created to store some of the target files which cannot be accommodated in the copy folder. Consequently, none of the target files is left out in the copy operation.

In addition, in the composite image apparatus and the copy method thereof according to an aspect of the present invention, if the user specifies the number of additional folders to be created during a copy operation, the target files are separately stored in the copy folder and the additional folders, where the number of the additional folders is the same as that specified by the user. Thus, the number of files in each folder decreases, facilitating editing work.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A copy method for use in a composite image apparatus, including an optical recording unit in which first and second storage media are each able to store a plurality of video files and a plurality of audio files, the apparatus being adapted to copy the files stored in one of the first and second storage media to the other, the method comprising:
    determining, if a copy direction and one or more target files to be copied among the files stored in the one storage medium are selected by a user in a copy operation, whether one or more additional folders must be created in the other storage medium together with a copy folder of a folder of the one storage medium containing the selected target files; and
    creating, if the additional folders are determined to have to be created together with the copy folder, the copy folder and additional folders in the other storage medium, and storing the selected target files separately in the created copy folder and additional folders.

2. The copy method as set forth in claim 1, wherein the determining comprises determining that the additional folders must be created in the other storage medium if a folder creation command is inputted by the user and the number of the additional folders to be created is specified by the user.

3. The copy method as set forth in claim 1, wherein the determining comprises determining that the additional folders must be created in the other storage medium if the number of the target files is larger than the number of files accommodatable in the copy folder.

4. The copy method as set forth in claim 1, further comprising storing all of the target files stored in the one storage medium in the copy folder of the other storage medium without creating the additional folders if the additional folders are determined to not be needed to be created in addition to the copy folder.

5. A composite image apparatus, comprising:
    an optical recording unit including a first storage medium to store a plurality of video files and a plurality of audio files;
    a second storage medium to also store the plurality of video files and the plurality of audio files; and
    a controller to, in a copy operation where the files stored in one of the first and second storage media are copied to the other and upon determining that one or more additional folders must be created together with a copy folder of a folder of the one storage medium containing one or more target files to be copied among the files stored in the one storage medium, create the copy folder and the additional folders in the other storage medium and store the target files separately in the created copy folder and additional folders.

6. The composite image apparatus as set forth in claim 5, wherein the controller determines that the additional folders must be created in the other storage medium if a folder creation command is inputted by a user and the number of the additional folders to be created is specified by the user.

7. The composite image apparatus as set forth in claim 5, wherein the controller determines that the additional folders must be created in the other storage medium if the number of the target files is larger than the number of files accommodatable in the copy folder.

8. The composite image apparatus as set forth in claim 5, wherein the controller stores all of the target files stored in the one storage medium in the copy folder of the other storage medium without creating the additional folders if the additional folders are determined to not be needed to be created in addition to the copy folder.

9. A method of operating a composite apparatus, in which a number of files are to be copied from a first storage medium to a second storage medium, wherein, if the number of files exceeds a file number capacity of a copy folder of the second storage medium, the method comprises automatically creating a sufficient number of additional folders in the second storage medium such that the number of files may be accommodated in the copy folder and the automatically created additional folders.

10. A method of operating a composite apparatus, in which a number of files are to be copied from a first storage medium to a second storage medium, the method comprising: providing a user with an option of creating additional folders in the second storage medium, in which files that cannot be accommodated in a copy folder of the second storage medium are to be stored, the copy folder having a limited file number capacity; if the user chooses to create additional folders, upon an input of a specified number of the additional folders, creating the specified number of additional folders with the number of files apportioned among the copy folder and the additional folders;
    if the user chooses not to create any additional folders and the number of files exceeds the file number capacity of the copy folder, automatically creating a sufficient number of additional folders such that the number of files may be accommodated in the copy folder and the automatically created additional folders; and
    if the user chooses not to create additional folders and the number of files does not exceed the file number capacity of the copy folder, storing the number of files in the copy folder.

11. The method according to claim 10, wherein, if the user chooses to create additional folders, the method further comprises determining whether the number of files exceeds the file number capacity of the copy folder and a number of files that may be accommodated in the specified number of additional folders.

12. The method according to claim 11, wherein, if the number of files does not exceed the file number capacity of the copy folder and the number of files that may be accommodated in the specified number of additional folders, the method comprises proceeding with the creating of the specified number of additional folders with the number of files apportioned among the copy folder and the additional folders.

13. The method according to claim 11, wherein, if the number of files exceeds the file number capacity of the copy folder and the number of files that may be accommodated in the specified number of additional folders, the method comprises automatically creating a number of secondary additional folders in the second storage medium in which the excessive files may be stored with the number of files apportioned among the copy folder, the additional folders, and the secondary additional folders.

14. A multi-media storage unit comprising:
a display to display an on-screen display image;
at least two storage units to store audio and video files; and
a controller to control file copying between the at least two storage units including determining, upon selection by a user through the display to copy at least one file within a folder from one storage unit to a target storage unit, whether additional folders must be created in the target storage unit together with a copy of the folder containing the at least one file.

15. The multi-media storage unit of claim 14, wherein the user can input through the display whether one or more additional folders must be created during a file copying operation.

* * * * *